(12) United States Patent
Arefi et al.

(10) Patent No.: US 9,148,792 B2
(45) Date of Patent: Sep. 29, 2015

(54) DYNAMIC CERTIFICATION SYSTEM FOR WIRELESS SPECTRUM SHARING

(71) Applicant: Intel Corporation, Santa Clara, CA (US)

(72) Inventors: Reza Arefi, Great Falls, VA (US); Markus Dominik Mueck, Neubiberg (DE)

(73) Assignee: Intel Corporation, Santa Clara, CA (US)

( * ) Notice: Subject to any disclaimer, the term of this patent is extended or adjusted under 35 U.S.C. 154(b) by 175 days.

(21) Appl. No.: 13/794,302

(22) Filed: Mar. 11, 2013

(65) Prior Publication Data
US 2014/0256345 A1 Sep. 11, 2014

(51) Int. Cl.
*H04M 1/66* (2006.01)
*H04M 3/00* (2006.01)
(Continued)

(52) U.S. Cl.
CPC .................................... *H04W 16/14* (2013.01)

(58) Field of Classification Search
CPC ... H04W 72/12; H04W 72/121; H04W 8/005; H04W 4/02; H04W 4/025; H04W 48/04; H04W 64/00; H04W 72/048; H04W 4/005; H04W 40/20; H04W 740/24; H04W 48/02; H04W 48/08; H04W 48/16; H04W 12/00; H04W 12/08; H04W 16/14; H04W 4/00; H04W 12/02; H04W 12/04; H04W 12/06; H04W 12/10; H04W 12/12; H04L 63/00; H04L 9/00; H04L 12/58
USPC ................ 455/41.2, 410–411, 418–420, 434, 455/452.2, 453–454, 456.1, 456.3, 461, 455/463, 517, 550.1, 552.1, 556.2, 455/557–558, 560–561; 370/310, 328–330, 370/338, 341
See application file for complete search history.

(56) References Cited

U.S. PATENT DOCUMENTS

| | | | |
|---|---|---|---|
| 8,139,496 B2 * | 3/2012 | Stanforth et al. | 370/252 |
| 2005/0005261 A1 * | 1/2005 | Severin | 717/108 |

(Continued)

FOREIGN PATENT DOCUMENTS

| | | |
|---|---|---|
| WO | 2013/126085 | 8/2013 |
| WO | 2013/154598 | 10/2013 |

(Continued)

OTHER PUBLICATIONS

International Search Report and Written Opinion received for PCT Patent Application No. PCT/US2014/019243, mailed on Jun. 26, 2014, 11 pages.

(Continued)

*Primary Examiner* — Meless Zewdu
(74) *Attorney, Agent, or Firm* — Grossman, Tucker, Perreault & Pfleger, PLLC

(57) ABSTRACT

This disclosure is directed to a dynamic certification system. In general, a device may transmit a request message to a cloud spectrum broker/licensed shared access (CSB/LSA) controller requesting certification for operation in shared wireless spectrum. The device may then receive a response message containing information on available certifications for operating in the shared wireless spectrum. If at least one available certification is determined to be usable by the device, then, depending on the system configuration, the device may claim an available certification (e.g., by obtaining an electronic certification document, token, etc.) or may request to use an available certificate, which may be confirmed by the CSB/LSA controller. The device may then operate in the shared wireless spectrum based on conditions set forth in the certificate.

17 Claims, 10 Drawing Sheets

(51) Int. Cl.
*H04W 4/00* (2009.01)
*H04W 72/00* (2009.01)
*H04W 16/14* (2009.01)

(56) References Cited

U.S. PATENT DOCUMENTS

| | | |
|---|---|---|
| 2009/0125429 A1* | 5/2009 | Takayama ............... 705/35 |
| 2010/0142454 A1 | 6/2010 | Chang |
| 2010/0261423 A1 | 10/2010 | Stanforth et al. |
| 2012/0142382 A1 | 6/2012 | Stanforth et al. |
| 2013/0142129 A1* | 6/2013 | Rinne et al. ............ 370/329 |
| 2013/0145165 A1* | 6/2013 | Brown et al. ........... 713/176 |
| 2013/0273881 A1 | 10/2013 | Sadeghi et al. |
| 2013/0273933 A1 | 10/2013 | Sadeghi et al. |
| 2013/0273952 A1 | 10/2013 | Srikanteswara et al. |
| 2013/0273953 A1 | 10/2013 | Srikanteswara et al. |
| 2013/0273958 A1 | 10/2013 | Srikanteswara et al. |
| 2013/0275346 A1 | 10/2013 | Srikanteswara et al. |
| 2013/0295948 A1* | 11/2013 | Ye et al. ............... 455/452.1 |
| 2014/0162617 A1 | 6/2014 | Mueck et al. |
| 2014/0171136 A1* | 6/2014 | Elrefaey et al. ......... 455/509 |
| 2014/0192685 A1 | 7/2014 | Mueck et al. |
| 2014/0220993 A1 | 8/2014 | Cordeiro et al. |
| 2014/0220999 A1 | 8/2014 | Cordeiro et al. |
| 2014/0237547 A1* | 8/2014 | Bose ...................... 726/3 |
| 2014/0256284 A1 | 9/2014 | Cordeiro et al. |

FOREIGN PATENT DOCUMENTS

| | | |
|---|---|---|
| WO | 2013/154599 | 10/2013 |
| WO | 2013/154600 | 10/2013 |

OTHER PUBLICATIONS

Paul et al., "A Metaheuristic based Fair Dynamic Spectrum Allocation Policy", Advanced Networks and Telecommunication Systems (ANTS), IEEE 5th International Conference, Dec. 18-21, 2011, pp. 1-6.

Intel presentation to ETSI RRS, "Cloud Spectrum Sharing", ETSI Document No. RRS(12)017018, Paris, France, Feb. 2012, 24 pages.

Intel white paper to ETSI RRS, "Cloud Spectrum Services (CSS)", ETSI Document No. RRS(12)018015, Chengdu, China, May 2012, 13 pages.

Current ETSI RRS activities of relevance to the revision of the R&TTE Directive and the future EC RRS standardization Mandate, Markus Mueck, INTEL presentation to ECC/COST "Workshop on Cognitive Radio and Software Defined Radio: Policy and Regulations Organised Jointly by ECC and Cost-Terra", May 2-3, 2012, Mainz, Germany, 5 pages.

Intel paper to APT Wireless Group (AWG-13), "Proposal on CRS Deployment Scenario—Cloud Spectrum Services (CSS)", Sep. 12-15, 2012, 1 page.

Draft Radio Spectrum Policy Group 2011, Report on CUS and other spectrum sharing approaches "Collective Use of Spectrum", Oct. 2011, 39 pages.

Radio Spectrum Policy Group 2011, Report on Collective Use of Spectrum [CUS} and other spectrum sharing approaches "Collective Use of Spectrum", Nov. 2011, 38 pages.

Report on ASA concept, FM(12)084 Annex 47, CEPT WG FM, 2012.

"New Work Item (NWI) to develop a System Reference Document (SRDoc) for mobile broadband services in the 2300-2400 MHz band under Licensed Shared Access regime", ETSI RRS, Document No. RRS(12)018018, May 2012, 4 pages.

Mueck et al., "Future of Wireless Communication: Radio apps and Related Security and Radio Computer Framework", IEEE Wireless Communications, Aug. 2012, pp. 9-16.

TR 102 967—"Reconfigurable Radio Systems (RRS); Use Cases for Dynamic Declaration of Conformity," (Draft Version), ETSI RRS, V0.0.4 (Sep. 2012), pp. 41.

Draft Directive of the European Parliament and of the Council (Draft Revision of the Directive 1999/5/EC of the European Parliament and of the Council of Mar. 9, 1999 on radio equipment and telecommunications terminal equipment and the mutual recognition of their conformity. (R&TTE Directive)).

* cited by examiner

FIG. 5
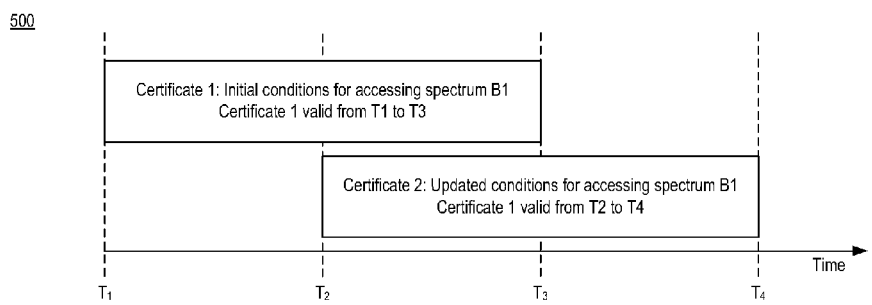
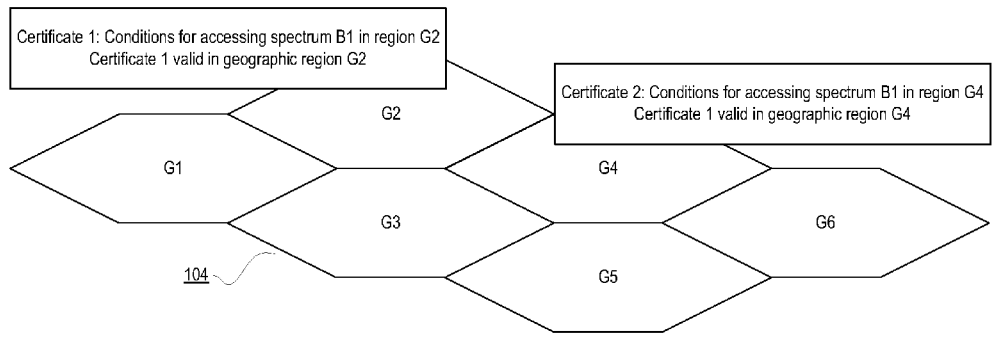

DYNAMIC CERTIFICATION SYSTEM FOR WIRELESS SPECTRUM SHARING

TECHNICAL FIELD

The present disclosure relates to wireless communication, and more particularly, to a system for dynamically controlling the ability of devices to access shared wireless spectrum.

BACKGROUND

As wireless technology continues to evolve, the number of wireless-enabled devices in the marketplace continues to expand. Not only are devices emerging that are primarily tasked with wireless communication (e.g., cellular handsets, smartphones, etc.), but also applications that did not previously include any form of communication functionality are becoming able to interact wirelessly. For example, vehicles, appliances, heating, ventilation and air conditioning (HVAC) systems, thermostats, manufacturing equipment, security systems, street signs etc. may all be configured to interact wirelessly, with other wireless applications being devised daily.

While the benefits of communication functionality associated with wireless devices may be apparent, an unintended consequence of this wireless explosion is the large amount of traffic that has been created. Wireless communication bandwidth may generally be divided into two categories: regulated spectrum and unregulated spectrum. Regulated spectrum may be reserved for government services (e.g., police, fire, etc.) or licensed to a wireless service provider for use exclusively by their subscribers. Unregulated spectrum may be used by anyone and is typically limited to short-range wireless communication mediums (e.g., Bluetooth, wireless local area networking (WLAN), etc.) in relatively "noisy" bandwidths. It might seem logical that designers would want to use unregulated spectrum whenever possible due to availability, cost savings, etc. While unregulated spectrum may be attractive for some uses, the limitations on its use (e.g., only for short-range wireless communication), interference caused by other signal sources operating in the same spectrum, etc. do not allow it to be a direct replacement for regulated spectrum. On the other hand, the amount of regulated spectrum is very limited. Emerging systems that seek to maximize the use of regulated spectrum by sharing access amongst a plurality of users face many challenges. The availability of new shared-use spectrum is problematic because the conditions under which the spectrum may be used safely have not yet been established. In particular, it may be necessary to maintain restrictions for newly available spectrum to protect legacy equipment, while still allowing limited usage until it is understood how all users can safely use the spectrum.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 5 illustrates example time and region-based certificates for operation in a dynamic certification system in accordance with at least one embodiment of the present disclosure;

Figure 1:
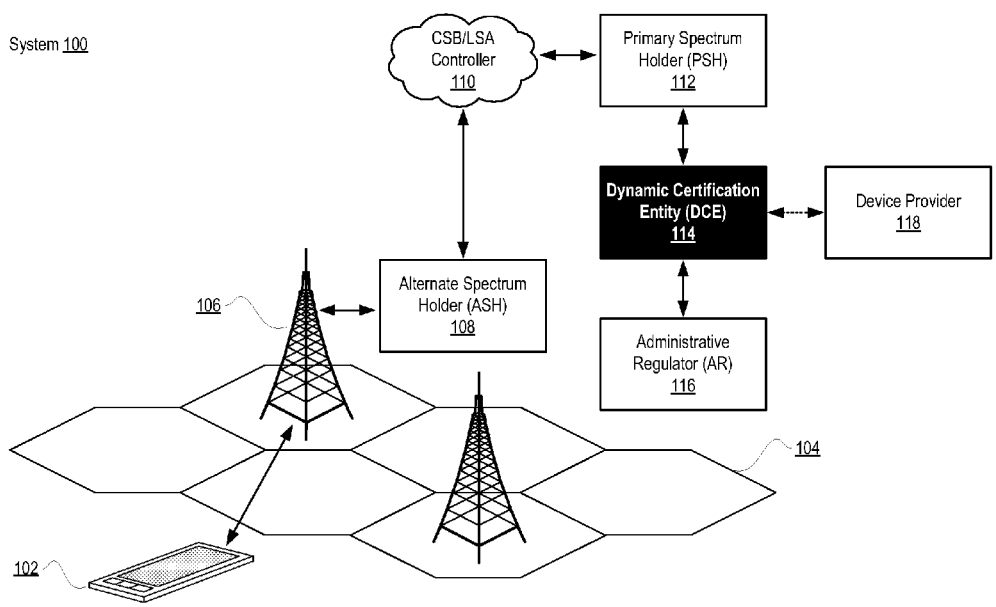
FIG. 1 illustrates an example dynamic certification system in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This disclosure is directed to a dynamic certification system. Certification, as referenced herein, may include processes by which wireless-enabled devices are given permission to operate in bands of the wireless spectrum for which they are not already licensed. These spectrum bands may include, for example, previously licensed areas of the spectrum that are reclaimed and made available for shared use (e.g., television (TV) white space, government/military bands, etc.). The use of these spectrum bands by new devices may be conditional to avoid interfering with legacy equipment that may still be operating in, or near to, these spectrum bands. In general, an event may occur causing a preference or requirement for a device to operate in shared wireless spectrum due to, for example, downloading a radio-enhanced application including a radio configuration for operating in the shared wireless spectrum, an instruction to operate in the shared wireless spectrum from a service provider, etc. The preference or requirement may then cause the device to transmit a request message to a cloud spectrum broker/licensed shared access (CSB/LSA) controller requesting certification for operation in the shared wireless spectrum. A response message may then be received containing information on available certifications for operating in the shared wireless spectrum. If at least one available certification is determined to be usable by the device, then, depending on system configuration, the device may either claim an available certification (in the form of an electronic certification document or token), or may request to use an available certificate that may later be confirmed by the CSB/LSA controller. The device may then operate in the shared wireless spectrum based on the certification. In one embodiment, the certification may allow the device to operate in the shared wireless spectrum based on at least one of time, device location or frequency bands.

In one embodiment there is a device comprising, for example, a communication module and a dynamic certification module. The communication module may be to communicate via at least wireless communication. The dynamic certification module may be to manage operation of the communication module based on a certification. The certification may, for example, allow the communication module to operate in shared wireless spectrum based on at least one of time, device location or frequency bands.

The certification may comprise at least one of an electronic certification document or electronic token received in the device from a CSB/LSA controller. In one embodiment, the CSB/LSA controller may be to receive the certification from a system comprising, for example, an administrative regulator to at least determine regulations for operating in the shared wireless spectrum, a responsible entity to at least generate certifications based on the regulations, and a dynamic certification entity to distribute the certifications to devices desiring to operate in the shared wireless spectrum. In an example of operation, the dynamic certification module may be to cause a request message to be transmitted to the CSB/LSA controller, the request message comprising at least device identification (ID), requested target certification validity and requested target certification region. The dynamic certification module may then be to receive a response message from the CSB/LSA controller, the response message comprising, for example, at least available certification information including for each available certification at least a certification ID, certification validity information and certification region information. The dynamic certification module may then be to determine if any of the available certifications are usable by the device for operating in the shared wireless spectrum, and if any of the available certifications are determined to be usable by the device, to cause an available certification request message to be transmitted to the CSB/LSA controller, the available certification request message including at least one certification ID corresponding to an available certification.

In one embodiment, the dynamic certification module is further to claim at least one of the available certifications, and is further to control operation of the communication module in the shared wireless spectrum based on the at least one available certification. For example, the dynamic certification module is to claim a first available certification having a first expiration based on at least one of time or region, and is to claim a second available certification having a second expiration based on at least one of a later time or different region prior to the expiration of the first available certification. In another embodiment, the dynamic certification module may be to receive an available certification confirmation message from the CSB/LSA controller prior to claiming at least one of the available certifications, the available certification confirmation message including at least one certification ID identifying the at least one available certificate to be claimed. In the same or a different embodiment the device may further comprise at least a processing module and memory module, the processing module causing the communication module to download a radio-enhanced application to the memory module, the radio-enhanced application causing the dynamic certification module to transmit the request message via the communication module. An example method consistent with the present disclosure may include, for example, transmitting a request message requesting a certification allowing for operation in shared wireless spectrum based on at least one of time, device location or frequency bands, receiving a response message including available certification information, and determining if operation in the shared wireless spectrum is permitted based on the response message.

FIG. 1 illustrates an example dynamic certification system in accordance with at least one embodiment of the present disclosure. Example system 100 may comprise device 102, wireless base stations 106 residing within various regions 104, alternate spectrum holder (ASH) 108, CSB/LSA controller 110, primary spectrum holder (PSH) 112, DCE 114 and administrative regulator (AR) 116. Initially, examples of device 102 may include a mobile communication device such as a cellular handset or a smartphone based on the Android® operating system (OS), iOS®, Windows® OS, Blackberry® OS, Palm® OS, Symbian® OS, etc., a mobile computing device such as a tablet computer like an iPad®, Galaxy Tab®, Kindle Fire®, etc., an Ultrabook® including a low-power chipset manufactured by Intel Corporation, a netbook, a notebook, a laptop, a palmtop, etc., a substantially stationary computing device such as a desktop computer, a set-top device, smart television (TV), etc.

During typical operation, device 102 may communicate with other devices via at least long-distance wireless communication. For example, device 102 may conduct voice and/or data communication via long-distance wireless networks using various wireless cellular technologies (examples of which will be discussed in FIG. 2). These long-distance wireless networks may be "cellular" in that various regions 104 may contain wireless cells including at least wireless base stations 106. Base stations 106 may be part of a wireless network wherein communication may be conducted over a particular wireless spectrum owned or leased by ASH 108. An example of ASH 108 may be a wireless service provider contracted to provide service to users of device 102.

In instances where device 102 may be required to operate in shared bandwidth, a request message may be transmitted from device 102 through wireless based station 106 and ASH 108 to CSB/LSA controller 110. CSB/LSA controller 110 may be a cloud resource (e.g., processing and/or storage resources accessible via a WAN like the Internet) to manage usage of shared wireless spectrum amongst a plurality of users (e.g., various devices 102 communicating on networks provided by at least one ASH 108). For example, dynamic spectrum access techniques such as licensed shared access (LSA) and its real-world implementations including cooperative spectrum sharing (CSS) may allow multimode devices (e.g., device 102) to operate dynamically over both private and shared wireless spectrum. However, regulatory conditions for establishing safe operation in some shared wireless spectrum may not be fully established under regulatory guidelines existing when a device is manufactured. Moreover, operation in shared wireless spectrum may be controlled by parameters different from those specified in previous regulatory guidelines (e.g., on which device communications may be based). For example, shared wireless spectrum may have regulatory requirements substantially different from that of cellular bands (e.g., aspects such as maximum transmitter power, out of band emissions, etc., may differ). Shared wireless spectrum may also be subject to exclusion zones (e.g., geographic areas in which shared wireless spectrum usage is not allowed. Exclusion zones may be meant to protect legacy equipment operating in the area, and thus, restricted operating conditions (e.g., lower emission power limits) may exist when device 102 attempts to operate close to these exclusion zones.

Shared wireless spectrum may also be available or unavailable in an unpredictable manner, especially where previously private wireless spectrum is reallocated for public use. In this regard, recently available shared wireless spectrum may have evolving regulatory requirements that are narrow at first introduction, but increase as safe operating limits are established. For example, when new wireless bandwidth becomes available for use within a spectrum sharing regime, it is expected that very stringent requirements will be imposed at first to protect legacy wireless equipment already operational within the shared wireless bandwidth. For example, output power levels, out-of-band radiation masks, etc. may be heavily restricted at first. These limitations may be stepped down until safe usage ranges are established. In existing regulatory systems shared wireless bandwidth may only be made available for use after final safe operating ranges have been established. These final safe operating ranges may then be designed into devices to ensure operation in compliance with regulatory limits. Given the limitations of this process, existing devices may be excluded from operation in shared bandwidth because the regulatory requirements of operating within this space were unknown prior to the release of these devices. Moreover, the release of new devices may be delayed waiting for final regulations. As new shared bandwidth is made available, these problems will continue, and may worsen, given existing operational schemes. Cross border issues (e.g., when devices cross from one geographic area into another, when communication signals emitted from devices cross into other geographic areas, etc.) may also exist, requiring special rules/mechanisms in order to avoid issues such as, for example, interference, etc. For example, cross-border management entities may be deployed that synchronize licensed band usage between neighboring countries. Without such provisions, lowered emission power levels may need to be imposed in cross border areas and/or the usage of certain shared bands may be prohibited when in close proximity to certain geographic borders.

In accordance with at least one embodiment, a dynamic system for adapting the operation of device 102 within shared wireless spectrum to evolving regulatory requirements is presented. DCE 114 may interact with CSB/LSA controller 110, PSH 112 and AR 116 to provide certification for operation in the shared wireless spectrum. For example, DCE 114 may interact with AR 116 to determine operational requirements/restrictions for operating in shared wireless spectrum held by PSH 112. AR 116 may be responsible for determining safe operating requirements within shared wireless spectrum and may include, for example, a governmental entity, an industry regulatory body, etc. PSH 112 may own wireless bandwidth to be reallocated as shared wireless spectrum and may include, for example, a governmental entity, an industry regulatory body, a private entity (e.g., legacy wireless equipment operators) willing to allow other devices to operate within its wireless spectrum, etc. It is important to note that while examples of PSH 112 and AR 116 are provided herein, their identities may vary on a regional basis (e.g., based on the manner in which wireless communication is regulated in a particular region). Regardless, DCE 114 may work with PSH 112 and AR 116 to determine safe operating conditions for shared wireless spectrum, and may utilize these conditions for certifying device 102 to operate within the shared wireless spectrum. While an embodiment consistent with the present disclosure has been presented, it is also important to note that other configurations are possible. For example, while not shown in FIG. 1, DCE 114 may also be situated in CSB/LSA controller 110. Such an implementation may allow for faster interaction between DCE 114 and CSB/LSA controller 110 and/or may save resources in that one entity performs two functions.

Device certification may comprise providing an electronic certification document, token, etc. to device 102 via CSB/LSA controller 110. The electronic certification document, token, etc. may include, for example, data in the form of a file, program stub, or other programmatic construct that may set forth conditions under which device 102 may operate safely within shared wireless spectrum. In this regard, the electronic certification document, token, etc. may contain information pertaining to a permitted duration of operation, regions where operation is permitted, permitted wireless communication mediums, permitted spectrum bands for operation, power levels, radiation masks, or any other limitation to ensure that the operation of device 102 is safe for other devices (e.g., legacy equipment) also operating within the shared wireless spectrum. In one embodiment, electronic certification documents, tokens, etc. may be generic (e.g., may be applicable to any device 102). Alternatively, electronic certification documents, tokens, etc. may be formatted in view of a device make, model, operating system, etc., and may be generated by, for example, device provider 118 based on regulations set forth by AR 116. Examples of device provider 118 may include device manufacturers (e.g., comprising one or more entities such as a device hardware provider, device software provider, etc.), a wireless service provider (e.g., in situations where the wireless service provider is responsible for all device software updates), etc.

Figure 2:
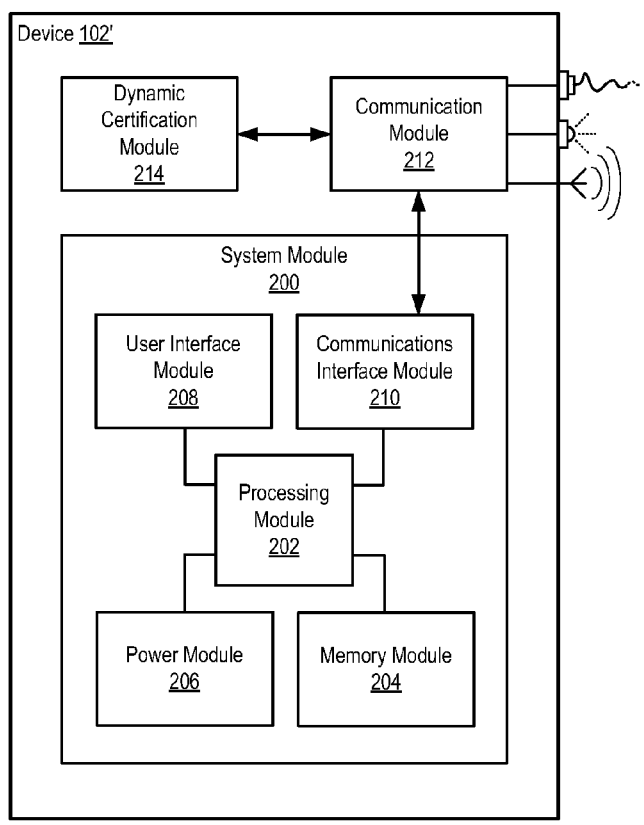
FIG. 2 illustrates an example configuration for a device usable in a dynamic certification system in accordance with at least one embodiment of the present disclosure.

FIG. 2 illustrates an example configuration for device 102' usable in accordance with at least one embodiment of the present disclosure. In particular, device 102' may perform example functionality such as disclosed in FIG. 1. Device 102' is meant only as an example of equipment that may be used in accordance with embodiments consistent with the present disclosure, and is not meant to limit these various embodiments to any particular manner of implementation.

Device 102' may comprise system module 200 configured to manage device operations. System module 200 may include, for example, processing module 202, memory module 204, power module 206, user interface module 208 and communication interface module 210 that may be configured to interact with communication module 212. Device 102' may also include dynamic certification module 214 configured to interact with at least communication module 212. While communication module 212 and dynamic certification module 214 have been shown separately from system module 200, this is merely for the *sake* of explanation herein. Some or all of the functionality associated with communication module 212 and/or dynamic certification module 214 may also be incorporated within system module 200.

In device 102', processing module 202 may comprise one or more processors situated in separate components, or alternatively, may comprise one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 102'. Some or all of the functionality commonly associated with the support circuitry may also be included in the same physical package as the processor (e.g., an SoC package like the Sandy Bridge integrated circuit available from the Intel Corporation).

Processing module 202 may be configured to execute various instructions in device 102'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include memory configured to hold information during the operation of device 102' such as, for example, static RAM (SRAM) or Dynamic RAM (DRAM). ROM may include memories such as bios memory configured to provide instructions when device 102' activates, programmable memories such as electronic programmable ROMs (EPROMS), Flash, etc. Other fixed and/or removable memory may include magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), etc. Power module 206 may include internal power sources (e.g., a battery) and/or external power sources (e.g., electromechanical or solar generator, power grid, fuel cell, etc.), and related circuitry configured to supply device 102' with the power needed to operate.

User interface module 208 may include circuitry configured to allow users to interact with device 102' such as, for example, various input mechanisms (e.g., microphones, switches, buttons, knobs, keyboards, speakers, touch-sensitive surfaces, one or more sensors configured to capture images and/or sense proximity, distance, motion, gestures, etc.) and output mechanisms (e.g., speakers, displays, lighted/flashing indicators, electromechanical components for vibration, motion, etc.). Communication interface module 210 may be configured to handle packet routing and other control functions for communication module 212, which may include resources configured to support wired and/or wireless communications. Wired communications may include serial and parallel wired mediums such as, for example, Ethernet, Universal Serial Bus (USB), Firewire, Digital Visual Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, WLAN, Wi-Fi, etc.) and long range wireless mediums (e.g., cellular wide area radio communication technology that may include, for example, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard). In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission.

In the embodiment illustrated in FIG. 2, dynamic certification module 214 may interact with communication module 212. For example, dynamic certification module 214 may utilize communication module 212 to send messages, to receive message and to control operation of device 102' within shared wireless spectrum. As will be described with respect to FIG. 3-7, dynamic certification module 214 may utilize when requesting certification information, when receiving available certification information and when claiming available certification. Upon receiving certification, device 102 may control the operation of communication module 214 in regard to output power, radiation masking, temporal and/or regional limitations, etc. to ensure operation in compliance with regulations pertaining to the particular shared wireless spectrum.

Figure 3:
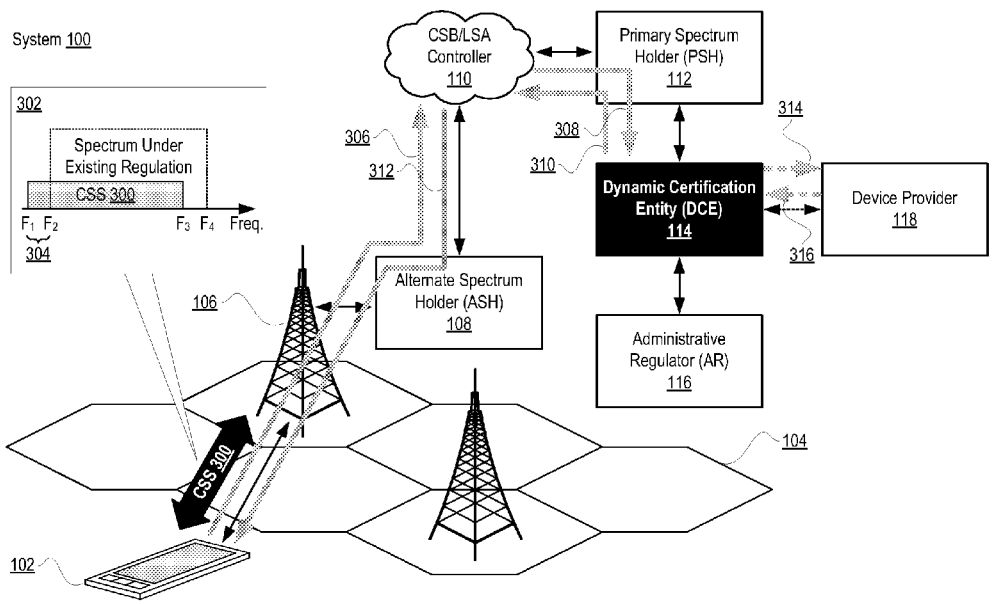
FIG. 3 illustrates example interaction within a dynamic certification system in accordance with at least one embodiment of the present disclosure.

FIG. 3 illustrates example interaction within a dynamic certification system in accordance with at least one embodiment of the present disclosure. Initially, an event may occur that causes a preference or requirement for device 102 to operate in CSS 300. For example, device 102 may download a Radioapp including radio configuration information for operating in CSS 300. As referenced herein, a Radioapp may comprise software (e.g., at least an application, or "app", and radio configuration software) that may modify radio characteristics in device 102. Examples of modifications may include configuring access mechanisms to enable shared wireless spectrum usage, but may also include changes entirely unrelated to shared wireless spectrum operation. In one embodiment, some Radioapps may require special certifications to operate in shared wireless spectrum. For example, Radioapp "RA" may require certification "CA" to operate in shared wireless spectrum, Radioapp "RB" may require certification "CB" to operate in shared wireless spectrum, etc. This certification scheme may control when Radioapps are allowed to be active, and may prevent two conflicting Radioapps from being active at the same time. However, it may also be possible for multiple Radioapps to be active if permitted by their individual certifications (e.g., "CA," "CB," etc.) or if a special certifications is provided (e.g., a "CAB" certification providing both CA and CB certification) that allows multiple Radioapps to be active. Radioapps may also be able to request information (e.g., directly from CSB/LSA controller 110) as to the conditions imposed by the latest certification issued for operating in shared wireless spectrum. This information may be useful in situations where the conditions are being broadened incrementally. This may allow the Radioapp to have the broadest allowed range of operation in the shared wireless spectrum.

In other circumstances it may be possible for ASH 108 to suggest or force device 102 to move to CSS 300 to alleviate traffic, dynamic certification module 214 in device 102 may sense that performance may be improved, cost may be reduced, etc. by operating in CSS 300, etc. Regardless for the need to operate in shared wireless spectrum, as shown at 302 CSS 300 may include wireless spectrum that falls within regulated spectrum between frequencies $F_2$ and $F_4$. However, as highlighted at 304, some of the wireless spectrum in CSS 300 may also be unregulated or may have regulations still under development (e.g., between frequencies $F_1$ and $F_3$). Thus, device 102 may operate freely in the regulated spectrum, but will need certification for operation in unregulated spectrum 304.

In pursuit of certification, device 102 may transmit information to CSB/LSA controller 110 as shown at 306, and may receive information from CSB/LSA controller 110 as shown at 312. The information transmitted at 306 may include requests for certification information and/or requests to utilize certificates. To fulfill these requests, CSB/LSA controller 110 may interact with at least DCE 114 as shown at 308 and 310. DCE 114 may, for example, receive certification requests from CSB/LSA controller 110 as shown at 308, and may provide certification information and certificates (e.g., electronic certification documents, tokens, etc.) to CSB/LSA controller 110 as shown at 310. The interaction between CSB/LSA controller 110 and DCE 114 may occur on an as-needed basis (e.g., as CSB/LSA controller 110 receives requests from device 102), periodically to maintain a certain number of available certificates in CSB/LSA controller 110, etc.

In one embodiment, certifications (e.g., electronic certification documents, tokens, etc.) may be generated by device provider 118 and then provided to DCE 114. For example, DCE 114 may request certification generation as shown at 314 (e.g., based on demand from CSB/LSA controller 110), and device provider 118 may respond by generating the requested certifications as shown at 316. Certification generation may be requested as needed, periodically, etc. It may also be possible for device provider 118 to provide DCE 114 with a blank or default certificate format for use with devices of certain types, and for DCE 114 to then configure the certificates for certifying operation in CSS 300. DCE 114 may then provide the certificates for operation in CSS 300 to CSB/LSA controller 110, which may provide a listing of available certificates for operating in CSS 300 to device 102 as shown at 312. Device 102 may then claim or request at least one of these certificates so that it may operate in CSS 300.

Figure 4:
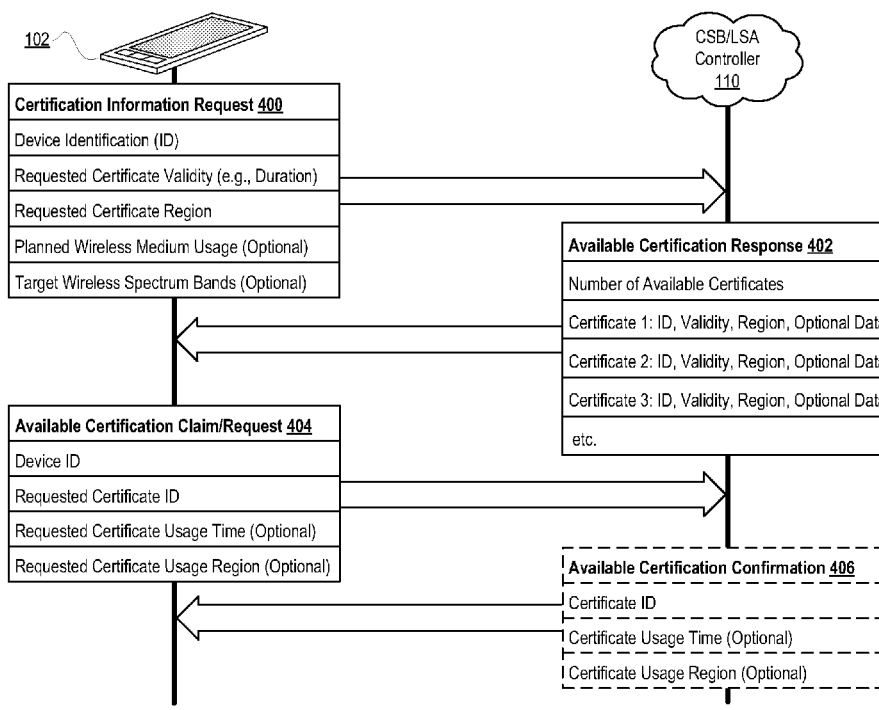
FIG. 4 illustrates example messaging within a dynamic certification system in accordance with at least one embodiment of the present disclosure.

FIG. 4 illustrates example messaging within a dynamic certification system in accordance with at least one embodiment of the present disclosure. As disclosed in regard to FIG. 4, a series of messages pertaining to certification may be exchanged between device 102 and CSB/LSA controller 110. For example, the interaction may start with certification information request message 400. Request message 400 may include, for example, identification (ID) for device 102, requested certificate validity and requested certificate region. Requested validity may pertain to a preferred duration before the certificate expires. Requested certificate region may pertain to the requested locations in which the certificate may be valid. Optionally, request message 400 may further inform CSB/LSA controller 110 as to the wireless communication mediums planned to be used during the requested validity in the requested location, and if known, target wireless spectrum bands that are preferred for use by device 102.

CSB/LSA controller 110 may respond to request message 402 by sending available certification response message 402 to device 102. Response message 402 may include at least the number of available certificates and certificate information for the available certificates. Certificate information may comprise, for example, at least certificate ID, validity and region information for each available certificate. Corresponding to the contents of request message 400, validity in response message 402 may indicate an amount of time during which a certificate is valid and region may indicate locations in which the certificate is valid. Optional data that may also be comprised within the certificate information may include, for example, wireless communication mediums that may in accordance with the certificate and spectrum bands accessible in accordance with the certificate. Due to spectrum sharing, new bands may be added or removed dynamically from the list of available shared wireless spectrum in response message 402. Each time a new band is made available for shared wireless operation, a new certification (e.g., electronic certificate, token, etc.) may also be available and listed in response message 402.

Device 102 may then make a determination as to whether any of the available certificates listed in response message 402 are usable for operating in the shared wireless spectrum. If at least one of the available certificates is determined to be usable, then device 102 may transmit available certificate claim/request message 404 to CSB/LSA controller 110. Claim/request message 404 may comprise, for example, at least device ID and a requested certificate ID. Optionally, claim/request message 404 may include requested certificate usage time and region information. For example, if the time that the certificate is anticipated to be needed is less than the duration of the certificate, or the certificate will be used in fewer regions then authorized in the certificate, device 102 may inform CSB/LSA controller 110 so that traffic handling may be adjusted. In such an instance CSB/LSA controller 110 may be able to, for example, issue another certificate based on the reduced actual usage of device 102.

As to whether message 404 is a claim or request depends on the configuration of system 100. In one embodiment device 102 may simply notify CSB/LSA controller 110 that it is claiming a certificate for use, and may then proceed to claim the certificate (e.g., download an electronic certificate document, token, etc.). CSB/LSA controller 110 may then understand that the license has been claimed, and may make adjustments for managing the shared wireless spectrum (e.g., controlling wireless traffic, avoiding possible interference with legacy users, etc.) based on the claim. In another embodiment, device 102 may request a certificate using claim/request message 404 and then await the receipt of available certification confirmation 406 from CSB/LSA controller 110. Confirmation message 406 may comprise, for example, at least a certificate ID that may be claimed by device 404. Optionally, confirmation 406 may include allowed certificate usage time and region (e.g., if the validity/region of the original available certificate was altered per optional information that was provided in request/claim message 406. Request-confirmation operations allow CSB/LSA controller 110 to proactively control activity in shared wireless spectrum, and thus, to have the option of refusing the request of device 102 if its operation in the shared wireless spectrum would jeopardize safe operation. For example, this may be beneficial to newly available shared wireless bandwidth wherein the conditions of safe operation are still being determined by PSH 112 and/or AR 116.

FIG. 5 illustrates example time and region-based certificates for operation in a dynamic certification system in accordance with at least one embodiment of the present disclosure. It is important to note that while FIG. 5 discloses two different types of limitations for certificates, time-based certificates at 500 and region-based certificates at 502, that temporal and regional limitations may also be used in conjunction in certificates. As shown at 500, certificate 1 may provide initial conditions for accessing spectrum B1 and may be valid from T1 to T3. Moreover, certificate 2 may provide update conditions for accessing spectrum B1 and may be valid from T2 to T4. Consistent with embodiments of the present disclosure, device 102 may claim/request both certificates 1 and 2 at the same time (if both certificates are available), may claim/request certificate 1 and then be able to manually or automatically claim/request certificate 2 at a later time (e.g., T2), etc. Regardless of the manner in which certificate 1 is obtained, device 102 may operate in accordance with the initial conditions set forth in certificate 1 from T1 to T2. At time T2, device 102 may already have, or may then obtain, certificate 2. In one embodiment, device 102 may then operate based on the initial conditions in certificate 1 or the updated conditions in certificate 2 from T2 to T3. Alternatively, device 102 may be forced to always observe the most recent conditions (e.g., updated conditions in certificate 2). From time T3 to T4 only certificate 2 is valid, and thus, device 102 observes the updated conditions. After time T4 a new certificate is needed or else device 102 may not be permitted to operate in the shared wireless spectrum.

Example 502 is similar to example 500 except based on regions 104. Certificate 1 may provide conditions for accessing spectrum B1 in geographic region G1. Likewise, certificate 2 may provide conditions for accessing spectrum B1 in geographic region G4. Again, device 102 may obtain both certificates at the same time (if available), may obtain certificate 2 manually or automatically upon passing from region G2 to region G4, etc. The transition of device 102 from region to region may be determined by, for example, device 102 registering with a wireless base station 106 in the new region. While in region 2, device 102 may operate in accordance with the conditions set forth in certificate 1. Upon moving from region G2 to G4, device 102 may then rely upon certificate 2 and may operate in accordance with the conditions set forth for region G4. While only two regions are discussed in example 502, the same behavior may be triggered when moving between any of regions G1 to G6. Moreover, it may be possible for a single certificate to be valid for more than one region 104 (e.g., G1 to G3) in instances where, for example, the required conditions for operating in any of one regions G1 to G3 are substantially similar.

Figure 6:
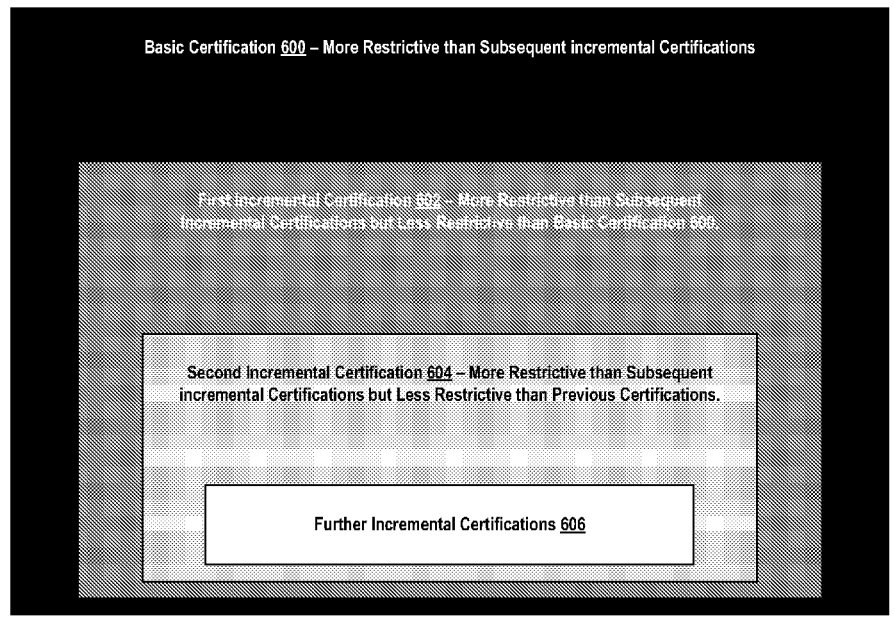
FIG. 6 illustrates example incremental certificates for operation in a dynamic certification system in accordance with at least one embodiment of the present disclosure.

FIG. 6 illustrates example incremental certificates for operation in a dynamic certification system in accordance with at least one embodiment of the present disclosure. Four incremental certificates 600 to 606 are illustrated in the example of FIG. 6, however, the use or more or less certificates is possible depending on the particular usage scenario (e.g., the maturity of shared wireless spectrum, the amount of legacy equipment operating in, or adjacent to, shared wireless spectrum, etc.). Basic certification 600 may be more restrictive than subsequent incremental certifications. For example, basic certification 600 may be the first level of certification allowed for shared wireless bandwidth that has just been made available by PSH 112 and/or AR 116. Basic certification 600 may allow limited access while still providing maximum protection for legacy equipment operating in, or adjacent to, the shared wireless spectrum. First incremental certification 602 may eventually replace basic certification 600, and may be more restrictive than subsequent incremental certifications but less restrictive than basic certification 600. For example, first incremental certification 602 may be the first change by PSH 112 and/or AR 116 opening up the shared wireless spectrum after some determination that the operations of other devices (e.g., device 102) is not negatively impacting (e.g., interfering with) legacy equipment. Second incremental certification 604 and further incremental certifications 606 may continue to reduce restrictions for operating in the shared wireless spectrum in an incremental or step-wise manner until operational conditions that are workable for both legacy equipment and other users (e.g., device 102) is achieved. Allowing incremental access in this manner may be beneficial at least in that access to the shared wireless bandwidth does not have to wait until final regulations are determined because conditions for access may be adjusted gradually throughout the process.

Figure 7:
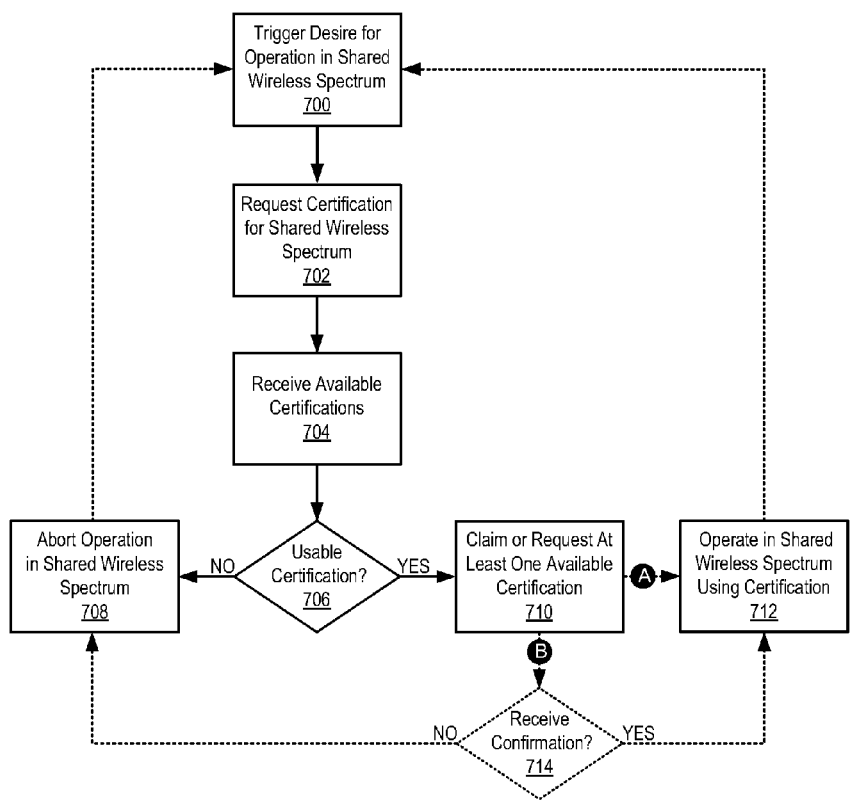
FIG. 7 illustrates example operations for a dynamic certification system in accordance with at least one embodiment of the present disclosure.

FIG. 7 illustrates example operations for a dynamic certification system in accordance with at least one embodiment of the present disclosure. In operation 700, an event may trigger a preference or a requirement for a device to operate in shared wireless spectrum. For example, a Radioapp including radio configuration information for operating in shared wireless spectrum may be downloaded to the device, an alternate spectrum holder may request or force the device to use shared wireless spectrum, etc. A message requesting certification for operating in the shared wireless spectrum may then be transmitted in operation 702. For example, the request message may be transmitted to a CSB. Following the receipt of an available certification response message in operation 704, a determination may then be made in operation 706 as to whether at least one of the available certifications identified in the available certification response message are usable by the device for operating in the shared wireless spectrum. If it is determined in operation 706 that none of the available certificates identified in the available certification response message are usable, then in operation 708 the device may abort its attempt to operate in the shared wireless spectrum. Optionally, operation 708 may then be followed by a return to operation 700 in preparation for the next event that triggers a preference or requirement for the device to operate within shared wireless spectrum.

If in operation 706 it is determined that there is at least one available certification usable by the device for operating in the shared wireless spectrum, then in operation 710 at least one available certification may be claimed/requested by, for example, transmitting a claim/request message back to the CSB. In an embodiment where at least one available certification is being claimed, as shown at "A" operation 710 may be followed by operation 712 wherein a certificate may be provided to the device, and the device may operate in the shared wireless spectrum based on various conditions associated with the certificate (e.g., validity, region, mediums, spectrum, etc.). Optionally, operation 712 may then be followed by a return to operation 700 in preparation for the next event that triggers a preference or requirement for the device to operate within shared wireless spectrum. Alternatively, in an embodiment where the available certification is being requested, as shown at "B" operation 710 may be followed by operation 714 wherein a determination may be made as to whether a message was received in the device (e.g., from the CSB) confirming the available certificate that the device may use to operate in the shared wireless spectrum. If in operation 714 it is determined that the device did not receive a confirmation, or received a message disallowing operation in the shared wireless spectrum, then in operation 708 operation in the shared wireless spectrum may be aborted. If in operation 714 it is determined that a confirmation message was received in the device, then in operation 712 a certificate may be provided to the device, which may operate in the shared wireless spectrum based on the conditions set forth in the certificate.

Figure 8:
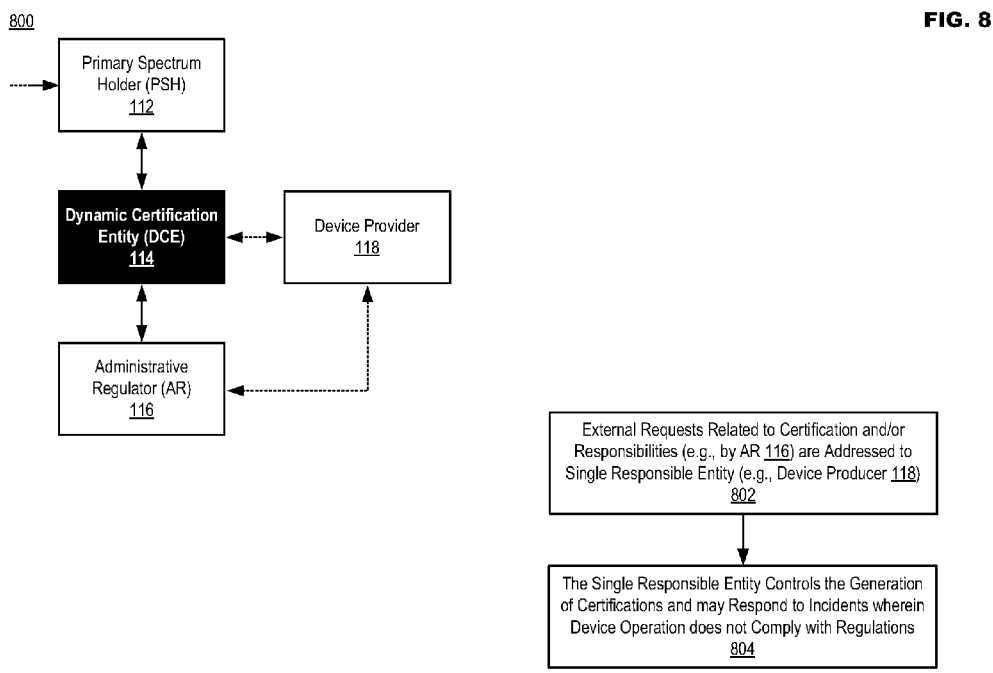
FIG. 8 illustrates an example system and operations for a vertical responsibility model in accordance with at least one embodiment of the present disclosure.

FIG. 8 illustrates an example system and operations for a vertical responsibility model in accordance with at least one embodiment of the present disclosure. For example, AR 116 may determine regulations for operating in shared wireless spectrum. However, there must also be a mechanism by which certifications are configured to observe these regulations, and in at least one embodiment, by which issues in regard to violations of these regulations may be handled.

FIG. 8 discloses example vertical responsibility model 800 consistent with at least one embodiment of the present disclosure. In model 800 generation of certifications (e.g., electronic certificate documents, tokens, etc.) and any certification-related issue resolution may be managed by a single responsible entity (e.g., device provider 118). Example operation in model 800 may involve substantially direct interaction between AR 116 and device provider 118 and DCE 114. AR 116 may provide regulations and requests (e.g., regarding the resolution of issues) to device provider 118, device provider 118 may generate certifications based on the regulations and/or requests and may then provide the certifications to DCE 114. An example of this interaction is summarized in operation 802 external requests related to certification and/or responsibilities (e.g., by AR 116) may be addressed to the single responsible entity (e.g., device provider 118). Then, in operation 804, the single responsible entity (e.g., device provider 118) may control the generation of certifications (e.g., based on regulations provided by AR 116) and may respond to incidents (e.g., requests from AR 116) where device operation does not comply with regulations.

For example, AR 116 may be notified that device 102 provided by device provider 118 interfered with legacy equipment operating in the same wireless spectrum as device 102. This interference may cause AR 116 to issue a request to device provider 802 to respond to and/or to resolve the situation. There are a variety of responses that device provider 118 may pursue. For example, device provider 116 may reconfigure certificate generation to reduce the chance that device 102 will cause interference. Future generated certificates may allow reduced emission power, may narrow the available wireless spectrum, etc. in order to avoid future problems. It may also be possible for device provider 118 to revoke the certificate used by device 102 to avoid future problems, and to possibly replace the certificate with a more restrictive certificate. In an extreme instance, device provider 118 may simply stop generating certificates for the particular shared wireless spectrum where the interference took place (e.g., until AR 116 can determine whether the regulations controlling operating in that spectrum need to be tightened).

Figure 9:
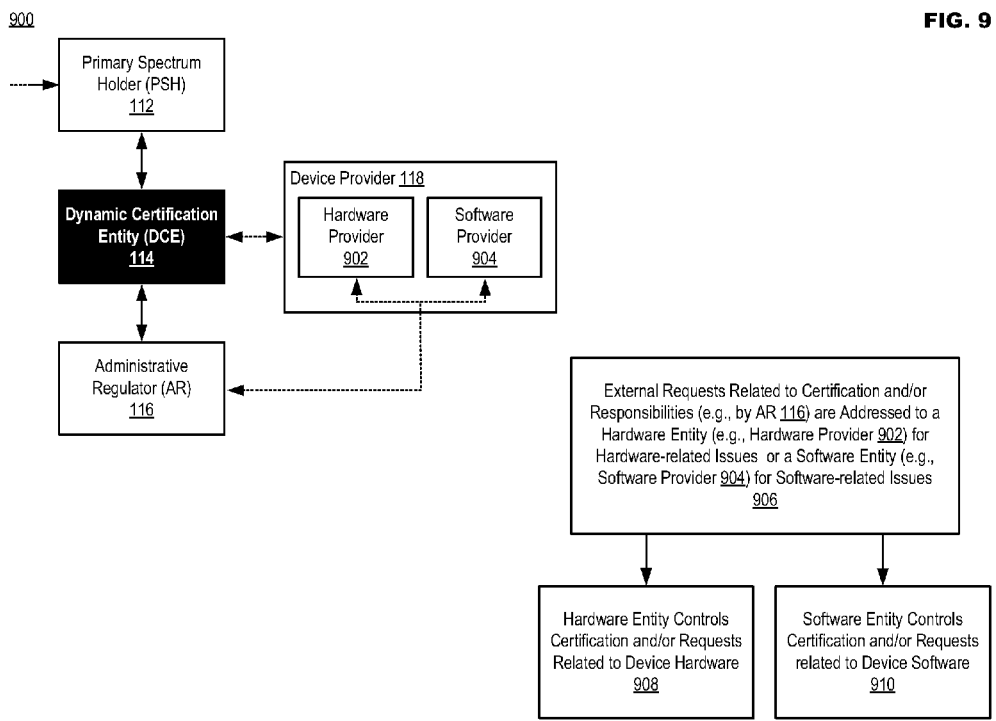
FIG. 9 illustrates an example system and operations for a horizontal responsibility model in accordance with at least one embodiment of the present disclosure.

An advantage of model 800 is that a single entity is responsible for certificate generation and issue resolution. However, devices are becoming more modular and different manufacturers are now responsible for different parts of the device. For example, there may be many different hardware platforms that run the same, or similar, operating system. In such an environment it may be problematic for device provider 118 to coordinate certificate generation and/or issue resolution for a variety of different part providers. FIG. 9 illustrates an example system and operations for a horizontal responsibility model in accordance with at least one embodiment of the present disclosure. Horizontal responsibility model 900 is similar to FIG. 8, but may divide the responsibility for handling issues between hardware provider 902 and software provider 904. Typically, hardware provider 902 may generate certifications related to the hardware platform of device 102 (e.g., including device 102 itself and possibly removable modules) and software manufacturer 904 may generate certifications related to software (e.g., OS, utilities, applications, etc.). While only two entities are disclosed for the *sake* of example herein, other entities may exist (e.g., a firmware manufacturer may generate certifications related to the firmware of the hardware platform, etc.). An example of interaction is summarized in operation 906 wherein external requests related to certification and/or responsibilities (e.g., by AR 116) are addressed to a hardware entity (e.g., hardware provider 902) for hardware-related issues or a software entity (e.g., software provider 904) for software-related issues (e.g., or other entities should they exist).

In operation 908 the hardware entity (e.g., hardware provider 902) may control certification and/or requests related to device hardware. Likewise, in operation 910 the software entity may control certification and/or requests related to device software.

In an instance where something goes wrong (e.g., an interference occurs or similar), the responsible entity needs to be identified depending on the type of issue. If hardware related, then hardware provider 902 needs to be addressed. If software related, then the software provider 904 needs to be addressed, etc. While possibly leading to quicker issue resolution when requests are correctly routed, model 900 may be challenging from the perspective of AR 116 since a single contact point for issues would be preferred. In model 900, a multitude of different contact points bring about the inherent risk that responsibilities may not be clear upon the occurrence of issues.

Figure 10:
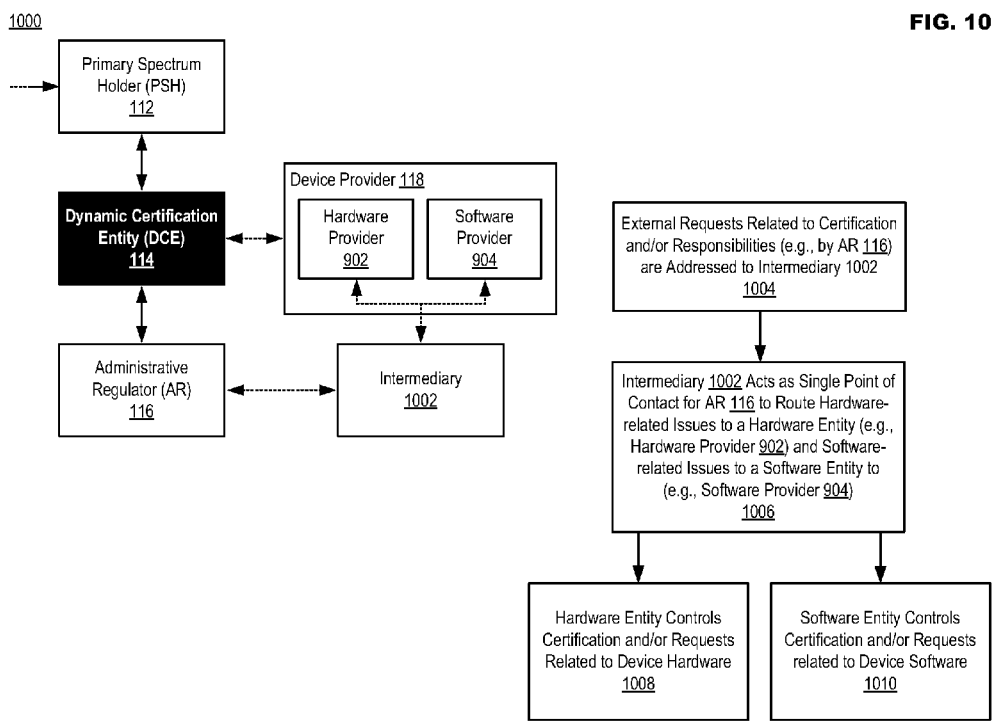
FIG. 10 illustrates an example system and operations for a hybrid responsibility model in accordance with at least one embodiment of the present disclosure.

FIG. 10 illustrates an example system and operations for a hybrid responsibility model in accordance with at least one embodiment of the present disclosure. Hybrid model 1000 includes intermediary 1002 between AR 116 and hardware provider 902, software provider 904 and any other providers that might exist (e.g., a firmware provider). Examples of intermediary 1002 may include a regulatory body created as a governmental, quasi-governmental entity or private entity, etc. As shown in operations 1004-1010, intermediary may receive information from AR 116 for distribution to the various providers. In particular, in operation 1004 external requests related to certification and/or responsibilities (e.g., by AR 116) may be addressed to intermediary 1002. In operation 1006 intermediary 1002 may then act as a single point of contact for AR 116 to route hardware-related issues to a hardware entity (e.g., hardware provider 902) and software-related issues to a software entity to (e.g., software provider 904). In operation 1008 the hardware entity (e.g., hardware provider 902) may control certification and/or requests related to device hardware. Likewise, in operation 1010 the software entity may control certification and/or requests related to device software. At least one advantage that is realized in hybrid model 1000 is that it incorporates beneficial aspects from both models 800 and 900. In particular, there is a single point of contact for AR 116, which may be preferable, while certification generation and issue resolution may be handled by the individual providers, which may result in faster response time. Of course, in practice the operation of hybrid model 1000 may depend on the effectiveness of intermediary 1002 to receive requests from AR 116 and route the requests to the providers. In one embodiment, this effectiveness may be controlled by the amount or resources made available for intermediary 1002, which may be determined based on the particular region in which system 100 is operating. Given the modularity of hybrid model 1000, resources may be allocated to AR 116 and/or intermediary 1002 the system as needed, thus reducing up-front investment, reducing waste and allowing the size of the system to grow appropriately (e.g., along with usage).

While FIGS. 7 to 10 illustrates operations according to an embodiment, it is to be understood that not all of the operations depicted in FIGS. 7 to 10 are necessary for other embodiments. Indeed, it is fully contemplated herein that in other embodiments of the present disclosure, the operations depicted in FIGS. 7 to 10, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, this disclosure is directed to a dynamic certification system. In general, a device may transmit a request message to a cloud spectrum broker/licensed shared access (CSB/LSA) controller requesting certification for operation in shared wireless spectrum. The device may then receive a response message containing information on available certifications for operating in the shared wireless spectrum. If at least one available certification is determined to be usable by the device, then, depending on the system configuration, the device may claim an available certification (e.g., by obtaining an electronic certification document, token, etc.) or may request to use an available certificate, which may be confirmed by the CSB/LSA controller. The device may then operate in the shared wireless spectrum based on conditions set forth in the certificate.

The following examples pertain to further embodiments. In one example there is provided a device. The device may include a communication module to communicate via at least wireless communication, and a dynamic certification module to manage operation of the communication module based on a certification, the certification allowing the communication module to operate in shared wireless spectrum based on at least one of time, device location or frequency bands.

The above example device may be further configured, wherein the certification comprises at least one of an electronic certification document or electronic token received in the device from a cloud spectrum broker/licensed shared access (CSB/LSA) controller. In this configuration the example device may be further configured, wherein the CSB/LSA controller is to receive the certification from a system comprising an administrative regulator to at least determine regulations for operating in the shared wireless spectrum, a responsible entity to at least generate certifications based on the regulations, and a dynamic certification entity to distribute the certifications to devices desiring to operate in the shared wireless spectrum. In this configuration the example device may be further configured, wherein the dynamic certification module is to cause a request message to be transmitted to the CSB/LSA controller, the request message comprising at least device identification (ID), requested target certification validity and requested target certification region. In this configuration the example device may be further configured, wherein the request message further comprises at least one of planned wireless medium usage and targeted wireless spectrum bands. In this configuration the example device may be further configured, wherein the dynamic certification module is to receive a response message from the CSB/LSA controller, the response message comprising at least available certification information including for each available certification at least a certification ID, certification validity information and certification region information. In this configuration the example device may be further configured, wherein the available certification information further comprises for each available certification at least one of permitted wireless medium usage and permitted wireless spectrum usage. In this configuration the example device may be further configured, wherein the dynamic certification module is to determine if any of the available certifications are usable by the device for operating in the shared wireless spectrum, and if any of the available certifications are determined to be usable by the device, to cause an available certification request message to be transmitted to the CSB/LSA controller, the available certification request message including at least one certification ID corresponding to an available certification. In this configuration the example device may be further configured, wherein the dynamic certification module is to claim at least one of the available certifications, and is further to control operation of the communication module in the shared wireless spectrum based on the at least one available certification. In this configuration the example device may be further configured, wherein the dynamic certification module is to claim a first available certification having a first expiration based on at least one of time or region, and is to claim a second available certification having a second expiration based on at least one of a later time or different region prior to the expiration of the first available certification. In this configuration the example device may be further configured, wherein the dynamic certification module is to receive an available certification confirmation message from the CSB/LSA controller prior to claiming at least one of the available certifications, the available certification confirmation message including at least one certification ID identifying the at least one available certificate to be claimed.

The above example device may further comprise, alone or in combination with the above further configurations, at least a processing module and memory module, the processing module causing the communication module to download a radio-enhanced application to the memory module, the radio-enhanced application causing the dynamic certification module to transmit the request message via the communication module.

In another example there is provided a method. The method may include transmitting a request message requesting a certification allowing for operation in shared wireless spectrum based on at least one of time, device location or frequency bands, receiving a response message including available certification information, and determining if operation in the shared wireless spectrum is permitted based on the response message.

The above example method may further comprise causing transmission of the request message by downloading a radio-enhanced application including radio configuration information for operating in the shared wireless spectrum.

The above example method may be further configured, alone or in combination with the above further configurations, wherein the certification comprises at least one of an electronic certification document or electronic token received in the device from a cloud spectrum broker/licensed shared access (CSB/LSA) controller. In this configuration the example method may be further configured, wherein the response message comprises available certification information including for each available certification at least certification ID, certification validity information and certification region information. In this configuration the example method may further comprise determining if any of the available certifications are usable by the device for operating in the shared wireless spectrum, and if any of the available certifications are determined to be usable by the device, transmitting an available certification request message including at least one certification ID corresponding to an available certification. In this configuration the example method may further comprise claiming at least one of the available certifications, and controlling operation of the device in the shared wireless spectrum based on the at least one available certification. In this configuration the example method may further comprise claiming a first available certification having a first expiration based on at least one of time or region, and claiming a second available certification having a second expiration based on at least one of a later time or different region prior to the expiration of the first available certification. In this configuration the example method may further comprise receiving an available certification confirmation message via the communication module prior to claiming at least one of the available certifications, the available certification confirmation message including at least one certificate ID identifying the at least one available certification to be claimed.

In another example there is provided at least one machine-readable storage medium having stored thereon, individually or in combination, instructions that when executed by one or more processors result in the following operations comprising transmitting a request message requesting a certification allowing for operation in shared wireless spectrum based on at least one of time, device location or frequency bands, receiving a response message including available certification information, and determining if operation in the shared wireless spectrum is permitted based on the response message.

The above example medium may further comprise instructions that when executed by one or more processors result in the following operations comprising causing transmission of the request message by downloading a radio-enhanced application including radio configuration information for operating in the shared wireless spectrum.

The above example medium may be further configured, alone or in combination with the above further configurations, wherein the certification comprises at least one of an electronic certification document or electronic token received in the device from a cloud spectrum broker/licensed shared access (CSB/LSA) controller. In this configuration the example medium may be further configured, wherein the response message comprises available certification information including for each available certification at least certification ID, certification validity information and certification region information. In this configuration the example medium may further comprise instructions that when executed by one or more processors result in the following operations comprising determining if any of the available certifications are usable by the device for operating in the shared wireless spectrum, and if any of the available certifications are determined to be usable by the device, transmitting an available certification request message including at least one certification ID corresponding to an available certification. In this configuration the example medium may further comprise instructions that when executed by one or more processors result in the following operations comprising claiming at least one of the available certifications, and controlling operation of the device in the shared wireless spectrum based on the at least one available certification. In this configuration the example medium may further comprise instructions that when executed by one or more processors result in the following operations comprising claiming a first available certification having a first expiration based on at least one of time or region, and claiming a second available certification having a second expiration based on at least one of a later time or different region prior to the expiration of the first available certification. In this configuration the example medium may further comprise instructions that when executed by one or more processors result in the following operations comprising receiving an available certification confirmation message via the communication module prior to claiming at least one of the available certifications, the available certification confirmation message including at least one certificate ID identifying the at least one available certification to be claimed.

In another example there is provided a system. The system may include at least a responsible entity to receive regulations regarding operation in shared wireless spectrum and requests related to certification and compliance with the regulations from an administrative regulator, generate certifications allowing devices to operate in the shared wireless spectrum based on at least the regulations, and provide the certifications to a dynamic certification entity for distribution to devices desiring to operate in the shared wireless spectrum.

The above example system may be further configured, wherein the requests comprise instances when the devices operating in the shared wireless spectrum are not operating in compliance with the regulations. In this configuration the example system may be further configured, wherein the responsible entity is further to determine why the devices are not operating in compliance with the regulations based on the requests, and change the generation of certifications based on the non-compliance determination. In this configuration the example system may be further configured, wherein the responsible entity is a provider of the devices. In this configuration the example system may be further configured, wherein the responsible entity comprises at least a device hardware provider to be responsible for responding to device hardware-related requests received from the administrative regulator and a device software provider to be responsible for responding to device software-related requests received from the administrative regulator. In this configuration the example system may be further configured, wherein the responsible entity further comprises an intermediary for receiving requests from the administrative regulator and for directing the requests to at least one of the device hardware provider or the device software provider.

In another example there is provided a method. The method may include receiving regulations regarding operation in shared wireless spectrum and requests related to certification and compliance with the regulations from an administrative regulator, generating certifications allowing devices to operate in the shared wireless spectrum based on at least the regulations, and providing the certifications to a dynamic certification entity for distribution to devices desiring to operate in the shared wireless spectrum.

The above example method may be further configured, wherein the requests comprise instances when the devices operating in the shared wireless spectrum are not operating in compliance with the regulations. In this configuration the example method may further comprise determining why the devices are not operating in compliance with the regulations based on the requests, and changing the generation of certifications based on the non-compliance determination. In this configuration the example method may be further configured, wherein the responsible entity is a provider of the devices. In this configuration the example method may be further configured, wherein the responsible entity comprises at least a device hardware provider to be responsible for responding to device hardware-related requests received from the administrative regulator and a device software provider to be responsible for responding to device software-related requests received from the administrative regulator. In this configuration the example method may be further configured, wherein the responsible entity further comprises an intermediary for receiving requests from the administrative regulator and for directing the requests to at least one of the device hardware provider or the device software provider.

In another example there is provided at least one machine-readable storage medium having stored thereon, individually or in combination, instructions that when executed by one or more processors result in the following operations comprising receiving regulations regarding operation in shared wireless spectrum and requests related to certification and compliance with the regulations from an administrative regulator, generating certifications allowing devices to operate in the shared wireless spectrum based on at least the regulations, and providing the certifications to a dynamic certification entity for distribution to devices desiring to operate in the shared wireless spectrum.

The above example medium may be further configured, wherein the requests comprise instances when the devices operating in the shared wireless spectrum are not operating in compliance with the regulations. In this configuration the example medium may further comprise instructions that when executed by one or more processors result in the following operations comprising determining why the devices are not operating in compliance with the regulations based on the requests, and changing the generation of certifications based on the non-compliance determination. In this configuration the example medium may be further configured, wherein the responsible entity is a provider of the devices. In this configuration the example medium may be further configured, wherein the responsible entity comprises at least a device hardware provider to be responsible for responding to device hardware-related requests received from the administrative regulator and a device software provider to be responsible for responding to device software-related requests received from the administrative regulator. In this configuration the example medium may be further configured, wherein the responsible entity further comprises an intermediary for receiving requests from the administrative regulator and for directing the requests to at least one of the device hardware provider or the device software provider.

In another embodiment there is provided a device. The device may include a communication module to communicate via at least wireless communication, and a dynamic certification module to manage operation of the communication module based on a certification, the certification allowing the communication module to operate in shared wireless spectrum based on at least one of time, device location or frequency bands.

The above example device may be further configured, wherein the certification comprises at least one of an electronic certification document or electronic token received in the device from a cloud spectrum broker/licensed shared access (CSB/LSA) controller. In this configuration the example device may be further configured, wherein the CSB/LSA controller is to receive the certification from a system comprising an administrative regulator to at least determine regulations for operating in the shared wireless spectrum, a responsible entity to at least generate certifications based on the regulations, and a dynamic certification entity to distribute the certifications to devices desiring to operate in the shared wireless spectrum. In this configuration the example device may be further configured, wherein the dynamic certification module is to cause a request message to be transmitted to the CSB/LSA controller, the request message comprising at least device identification (ID), requested target certification validity and requested target certification region. In this configuration the example device may be further configured, wherein the request message further comprises at least one of planned wireless medium usage and targeted wireless spectrum bands. In this configuration the example device may be further configured, wherein the dynamic certification module is to receive a response message from the CSB/LSA controller, the response message comprising at least available certification information including for each available certification at least a certification ID, certification validity information and certification region information. In this configuration the example device may be further configured, wherein the available certification information further comprises for each available certification at least one of permitted wireless medium usage and permitted wireless spectrum usage. In this configuration the example device may be further configured, wherein the dynamic certification module is to determine if any of the available certifications are usable by the device for operating in the shared wireless spectrum, and if any of the available certifications are determined to be usable by the device, to cause an available certification request message to be transmitted to the CSB/LSA controller, the available certification request message including at least one certification ID corresponding to an available certification. In this configuration the example device may be further configured, wherein the dynamic certification module is to claim at least one of the available certifications, and is further to control operation of the communication module in the shared wireless spectrum based on the at least one available certification. In this configuration the example device may be further configured, wherein the dynamic certification module is to claim a first available certification having a first expiration based on at least one of time or region, and is to claim a second available certification having a second expiration based on at least one of a later time or different region prior to the expiration of the first available certification. In this configuration the example device may be further configured, wherein the dynamic certification module is to receive an available certification confirmation message from the CSB/LSA controller prior to claiming at least one of the available certifications, the available certification confirmation message including at least one certification ID identifying the at least one available certificate to be claimed.

The above example device may further comprise, alone or in combination with the above further configurations, at least a processing module and memory module, the processing module causing the communication module to download a radio-enhanced application to the memory module, the radio-enhanced application causing the dynamic certification module to transmit the request message via the communication module.

In another example there is provided a method. The method may include transmitting a request message requesting a certification allowing for operation in shared wireless spectrum based on at least one of time, device location or frequency bands, receiving a response message including available certification information, and determining if operation in the shared wireless spectrum is permitted based on the response message.

The above example method may further comprise causing transmission of the request message by downloading a radio-enhanced application including radio configuration information for operating in the shared wireless spectrum.

The above example method may be further configured, alone or in combination with the above further configurations, wherein the certification comprises at least one of an electronic certification document or electronic token received in the device from a cloud spectrum broker/licensed shared access (CSB/LSA) controller. In this configuration the example method may be further configured, wherein the response message comprises available certification information including for each available certification at least certification ID, certification validity information and certification region information. In this configuration the example method may further comprise determining if any of the available certifications are usable by the device for operating in the shared wireless spectrum, and if any of the available certifications are determined to be usable by the device, transmitting an available certification request message including at least one certification ID corresponding to an available certification. In this configuration the example method may further comprise claiming at least one of the available certifications, and controlling operation of the device in the shared wireless spectrum based on the at least one available certification. In this configuration the example method may further comprise claiming a first available certification having a first expiration based on at least one of time or region, and claiming a second available certification having a second expiration based on at least one of a later time or different region prior to the expiration of the first available certification. In this configuration, the example method may further comprise receiving an available certification confirmation message via the communication module prior to claiming at least one of the available certifications, the available certification confirmation message including at least one certificate ID identifying the at least one available certification to be claimed.

In another example there is provided a system comprising at least a device and a CSB/LSA controller, the system being arranged to perform any of the above example methods.

In another example there is provided a chipset arranged to perform any of the above example methods.

In another example there is provided at least one machine readable medium comprising a plurality of instructions that, in response to be being executed on a computing device, cause the computing device to carry any of the above example methods.

In another example there is provided a device configured for use with a dynamic certification system, the device being arranged to perform any of the above example methods.

In another example there is provided a device having means to perform any of the above example methods.

In another example there is provided a system comprising at least a responsible entity to receive regulations regarding operation in shared wireless spectrum and requests related to certification and compliance with the regulations from an administrative regulator, generate certifications allowing devices to operate in the shared wireless spectrum based on at least the regulations, and provide the certifications to a dynamic certification entity for distribution to devices desiring to operate in the shared wireless spectrum.

The above example system may be further configured, wherein the requests comprise instances when the devices operating in the shared wireless spectrum are not operating in compliance with the regulations. In this configuration the example system may be further configured, wherein the responsible entity is further to determine why the devices are not operating in compliance with the regulations based on the requests, and change the generation of certifications based on the non-compliance determination. In this configuration the example system may be further configured, wherein the responsible entity is a provider of the devices. In this configuration the example system may be further configured, wherein the responsible entity comprises at least a device hardware provider to be responsible for responding to device hardware-related requests received from the administrative regulator and a device software provider to be responsible for responding to device software-related requests received from the administrative regulator. In this configuration the example system may be further configured, wherein the responsible entity further comprises an intermediary for receiving requests from the administrative regulator and for directing the requests to at least one of the device hardware provider or the device software provider.

In another example there is provided a method. The method may include receiving regulations regarding operation in shared wireless spectrum and requests related to certification and compliance with the regulations from an administrative regulator, generating certifications allowing devices to operate in the shared wireless spectrum based on at least the regulations, and providing the certifications to a dynamic certification entity for distribution to devices desiring to operate in the shared wireless spectrum.

The above example method may be further configured, wherein the requests comprise instances when the devices operating in the shared wireless spectrum are not operating in compliance with the regulations. In this configuration the example method may further comprise determining why the devices are not operating in compliance with the regulations based on the requests, and changing the generation of certifications based on the non-compliance determination. In this configuration the example method may be further configured, wherein the responsible entity is a provider of the devices. In this configuration the example method may be further configured, wherein the responsible entity comprises at least a device hardware provider to be responsible for responding to device hardware-related requests received from the administrative regulator and a device software provider to be responsible for responding to device software-related requests received from the administrative regulator. In this configuration the example method may be further configured, wherein the responsible entity further comprises an intermediary for receiving requests from the administrative regulator and for directing the requests to at least one of the device hardware provider or the device software provider.

In another example there is provided at least a system comprising at least a responsible entity, an administrative regulator and a dynamic certification entity, the system being arranged to perform any of the above example methods.

In another example there is provided a chipset arranged to perform any of the above example methods.

In another example there is provided at least one machine readable medium comprising a plurality of instructions that, in response to be being executed on a computing device, cause the computing device to carry out any of the above example methods.

In another example there is provided a device configured for use with a dynamic certification system, the device being arranged to perform any of the above example methods.

In another example there is provided a device having means to perform any of the above example methods.

In another example there is provided a device. The device may include a communication module to communicate via at least wireless communication, and a dynamic certification module to manage operation of the communication module based on a certification, the certification allowing the communication module to operate in shared wireless spectrum based on at least one of time, device location or frequency bands.

The above example device may be further configured, wherein the certification comprises at least one of an electronic certification document or electronic token received in the device from a cloud spectrum broker/licensed shared access (CSB/LSA) controller. In this configuration the example device may be further configured, wherein the dynamic certification module is to cause a request message to be transmitted to the CSB/LSA controller, the request message comprising at least device identification (ID), requested target certification validity and requested target certification region, and receive a response message from the CSB/LSA controller, the response message comprising at least available certification information including for each available certification at least a certification ID, certification validity information and certification region information. In this configuration the example device may be further configured, wherein the dynamic certification module is to determine if any of the available certifications are usable by the device for operating in the shared wireless spectrum, and if any of the available certifications are determined to be usable by the device, to cause an available certification request message to be transmitted to the CSB/LSA controller, the available certification request message including at least one certification ID corresponding to an available certification. In this configuration the example device may be further configured, wherein the dynamic certification module is to claim at least one of the available certifications, and is further to control operation of the communication module in the shared wireless spectrum based on the at least one available certification. In this configuration the example device may be further configured, wherein the dynamic certification module is to receive an available certification confirmation message from the CSB/LSA controller prior to claiming at least one of the available certifications, the available certification confirmation message including at least one certification ID identifying the at least one available certificate to be claimed.

The above example device may further comprise, alone or in combination with the above further configurations, at least a processing module and memory module, the processing module causing the communication module to download a radio-enhanced application to the memory module, the radio-enhanced application causing the dynamic certification module to transmit the request message via the communication module.

In another example there is provided a method. The method may include transmitting a request message requesting a certification allowing for operation in shared wireless spectrum based on at least one of time, device location or frequency bands, receiving a response message including available certification information, and determining if operation in the shared wireless spectrum is permitted based on the response message.

The above example method may be further configured, wherein the certification comprises at least one of an electronic certification document or electronic token received in the device from a cloud spectrum broker/licensed shared access (CSB/LSA) controller.

The above example method may be further configured, alone or in combination with the above further configurations, wherein the response message comprises available certification information including for each available certification at least certification ID, certification validity information and certification region information. In this configuration the example method may further comprise determining if any of the available certifications are usable by the device for operating in the shared wireless spectrum, if any of the available certifications are determined to be usable by the device, transmitting an available certification request message including at least one certification ID corresponding to an available certification, claiming at least one of the available certifications, and controlling operation of the device in the shared wireless spectrum based on the at least one available certification. In this configuration the example method may further comprise receiving an available certification confirmation message via the communication module prior to claiming at least one of the available certifications, the available certification confirmation message including at least one certificate ID identifying the at least one available certification to be claimed.

In another example there is provided a system comprising at least a device, the system being arranged to perform any of the above example methods.

In another example there is provided a chipset arranged to perform any of the above example methods.

In another example there is provided at least one machine readable medium comprising a plurality of instructions that, in response to be being executed on a computing device, cause the computing device to carry out any of the above example methods.

In one example there is provided a device. The device may include a communication module to communicate via at least wireless communication, and a dynamic certification module to manage operation of the communication module based on a certification, the certification allowing the communication module to operate in shared wireless spectrum based on at least one of time, device location or frequency bands.

The above example device may be further configured, wherein the certification comprises at least one of an electronic certification document or electronic token received in the device from a cloud spectrum broker/licensed shared access (CSB/LSA) controller. In this configuration the example device may be further configured, wherein the CSB/LSA controller is to receive the certification from a system comprising an administrative regulator to at least determine regulations for operating in the shared wireless spectrum, a responsible entity to at least generate certifications based on the regulations, and a dynamic certification entity to distribute the certifications to devices desiring to operate in the shared wireless spectrum. In this configuration the example device may be further configured, wherein the dynamic certification module is to cause a request message to be transmitted to the CSB/LSA controller, the request message comprising at least device identification (ID), requested target certification validity and requested target certification region. In this configuration the example device may be further configured, wherein the request message further comprises at least one of planned wireless medium usage and targeted wireless spectrum bands. In this configuration the example device may be further configured, wherein the dynamic certification module is to receive a response message from the CSB/LSA controller, the response message comprising at least available certification information including for each available certification at least a certification ID, certification validity information and certification region information. In this configuration the example device may be further configured, wherein the available certification information further comprises for each available certification at least one of permitted wireless medium usage and permitted wireless spectrum usage. In this configuration the example device may be further configured, wherein the dynamic certification module is to determine if any of the available certifications are usable by the device for operating in the shared wireless spectrum, and if any of the available certifications are determined to be usable by the device, to cause an available certification request message to be transmitted to the CSB/LSA controller, the available certification request message including at least one certification ID corresponding to an available certification. In this configuration the example device may be further configured, wherein the dynamic certification module is to claim at least one of the available certifications, and is further to control operation of the communication module in the shared wireless spectrum based on the at least one available certification. In this configuration the example device may be further configured, wherein the dynamic certification module is to claim a first available certification having a first expiration based on at least one of time or region, and is to claim a second available certification having a second expiration based on at least one of a later time or different region prior to the expiration of the first available certification. In this configuration the example device may be further configured, wherein the dynamic certification module is to receive an available certification confirmation message from the CSB/LSA controller prior to claiming at least one of the available certifications, the available certification confirmation message including at least one certification ID identifying the at least one available certificate to be claimed.

The above example device may further comprise, alone or in combination with the above further configurations, at least a processing module and memory module, the processing module causing the communication module to download a radio-enhanced application to the memory module, the radio-enhanced application causing the dynamic certification module to transmit the request message via the communication module.

In another example there is provided a method. The method may include transmitting a request message requesting a certification allowing for operation in shared wireless spectrum based on at least one of time, device location or frequency bands, receiving a response message including available certification information, and determining if operation in the shared wireless spectrum is permitted based on the response message.

The above example method may further comprise causing transmission of the request message by downloading a radio-enhanced application including radio configuration information for operating in the shared wireless spectrum.

The above example method may be further configured, alone or in combination with the above further configurations, wherein the certification comprises at least one of an electronic certification document or electronic token received in the device from a cloud spectrum broker/licensed shared access (CSB/LSA) controller. In this configuration the example method may be further configured, wherein the response message comprises available certification information including for each available certification at least certification ID, certification validity information and certification region information. In this configuration the example method may further comprise determining if any of the available certifications are usable by the device for operating in the shared wireless spectrum, and if any of the available certifications are determined to be usable by the device, transmitting an available certification request message including at least one certification ID corresponding to an available certification. In this configuration the example method may further comprise claiming at least one of the available certifications, and controlling operation of the device in the shared wireless spectrum based on the at least one available certification. In this configuration the example method may further comprise claiming a first available certification having a first expiration based on at least one of time or region, and claiming a second available certification having a second expiration based on at least one of a later time or different region prior to the expiration of the first available certification. In this configuration the example method may further comprise receiving an available certification confirmation message via the communication module prior to claiming at least one of the available certifications, the available certification confirmation message including at least one certificate ID identifying the at least one available certification to be claimed.

In another example there is provided a system. The system may include means for means for transmitting a request message requesting a certification allowing for operation in shared wireless spectrum based on at least one of time, device location or frequency bands, means for receiving a response message including available certification information, and means for determining if operation in the shared wireless spectrum is permitted based on the response message.

The above example system may further comprise means for causing transmission of the request message by downloading a radio-enhanced application including radio configuration information for operating in the shared wireless spectrum.

The above example system may be further configured, alone or in combination with the above further configurations, wherein the certification comprises at least one of an electronic certification document or electronic token received in the device from a cloud spectrum broker/licensed shared access (CSB/LSA) controller. In this configuration the example system may be further configured, wherein the response message comprises available certification information including for each available certification at least certification ID, certification validity information and certification region information. In this configuration the example system may further comprise means for determining if any of the available certifications are usable by the device for operating in the shared wireless spectrum, and means for, if any of the available certifications are determined to be usable by the device, transmitting an available certification request message including at least one certification ID corresponding to an available certification. In this configuration the example system may further comprise means for claiming at least one of the available certifications, and means for controlling operation of the device in the shared wireless spectrum based on the at least one available certification. In this configuration the example system may further comprise means for claiming a first available certification having a first expiration based on at least one of time or region, and means for claiming a second available certification having a second expiration based on at least one of a later time or different region prior to the expiration of the first available certification. In this configuration the example system may further comprise means for receiving an available certification confirmation message via the communication module prior to claiming at least one of the available certifications, the available certification confirmation message including at least one certificate ID identifying the at least one available certification to be claimed.

In another example there is provided a system. The system may include at least a responsible entity to receive regulations regarding operation in shared wireless spectrum and requests related to certification and compliance with the regulations from an administrative regulator, generate certifications allowing devices to operate in the shared wireless spectrum based on at least the regulations, and provide the certifications to a dynamic certification entity for distribution to devices desiring to operate in the shared wireless spectrum.

The above example system may be further configured, wherein the requests comprise instances when the devices operating in the shared wireless spectrum are not operating in compliance with the regulations. In this configuration the example system may be further configured, wherein the responsible entity is further to determine why the devices are not operating in compliance with the regulations based on the requests, and change the generation of certifications based on the non-compliance determination. In this configuration the example system may be further configured, wherein the responsible entity is a provider of the devices. In this configuration the example system may be further configured, wherein the responsible entity comprises at least a device hardware provider to be responsible for responding to device hardware-related requests received from the administrative regulator and a device software provider to be responsible for responding to device software-related requests received from the administrative regulator. In this configuration the example system may be further configured, wherein the responsible entity further comprises an intermediary for receiving requests from the administrative regulator and for directing the requests to at least one of the device hardware provider or the device software provider.

In another example there is provided a method. The method may include receiving regulations regarding operation in shared wireless spectrum and requests related to certification and compliance with the regulations from an administrative regulator, generating certifications allowing devices to operate in the shared wireless spectrum based on at least the regulations, and providing the certifications to a dynamic certification entity for distribution to devices desiring to operate in the shared wireless spectrum.

The above example method may be further configured, wherein the requests comprise instances when the devices operating in the shared wireless spectrum are not operating in compliance with the regulations. In this configuration the example method may further comprise determining why the devices are not operating in compliance with the regulations based on the requests, and changing the generation of certifications based on the non-compliance determination. In this configuration the example method may be further configured, wherein the responsible entity is a provider of the devices. In this configuration the example method may be further configured, wherein the responsible entity comprises at least a device hardware provider to be responsible for responding to device hardware-related requests received from the administrative regulator and a device software provider to be responsible for responding to device software-related requests received from the administrative regulator. In this configuration the example method may be further configured, wherein the responsible entity further comprises an intermediary for receiving requests from the administrative regulator and for directing the requests to at least one of the device hardware provider or the device software provider.

In another embodiment there is provided a system. The system may include means for receiving regulations regarding operation in shared wireless spectrum and requests related to certification and compliance with the regulations from an administrative regulator, means for generating certifications allowing devices to operate in the shared wireless spectrum based on at least the regulations, and means for providing the certifications to a dynamic certification entity for distribution to devices desiring to operate in the shared wireless spectrum.

The above example system may be further configured, wherein the requests comprise instances when the devices operating in the shared wireless spectrum are not operating in compliance with the regulations. In this configuration the example system may further comprise means for determining why the devices are not operating in compliance with the regulations based on the requests, and means for changing the generation of certifications based on the non-compliance determination. In this configuration the example system may be further configured, wherein the responsible entity is a provider of the devices. In this configuration the example system may be further configured, wherein the responsible entity comprises at least a device hardware provider to be responsible for responding to device hardware-related requests received from the administrative regulator and a device software provider to be responsible for responding to device software-related requests received from the administrative regulator. In this configuration the example system may be further configured, wherein the responsible entity further comprises an intermediary for receiving requests from the administrative regulator and for directing the requests to at least one of the device hardware provider or the device software provider.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device, comprising:
    a communication module to communicate via at least a wireless communication; and
    a dynamic certification module to manage operation of the communication module based on a certification, the certification allowing the communication module to operate in shared wireless spectrum based on at least one of time, device location or frequency bands;
    wherein:
    the certification comprises at least one of an electronic certification document or electronic token received in the device from a cloud spectrum broker/licensed shared access (CSB/LSA) controller;
    the dynamic certification module is further to receive a response message from the CSB/LSA controller, the response message comprising at least available certification information including for each available certification at least a certification ID, certification validity information and certification region information; and
    the dynamic certification module is further to determine if any of the available certifications are usable by the device for operating in the shared wireless spectrum, and if any of the available certifications are determined to be usable by the device, to cause an available certification request message to be transmitted to the CSB/LSA controller, the available certification request message including at least one certification ID corresponding to an available certification.

2. The device of claim 1, wherein the CSB/LSA controller is to receive the certification from a system comprising an administrative regulator to at least determine regulations for operating in the shared wireless spectrum, a responsible entity to at least generate certifications based on the regulations, and a dynamic certification entity to distribute the certifications to devices desiring to operate in the shared wireless spectrum.

3. The device of claim 1, wherein the dynamic certification module is to cause a request message to be transmitted to the CSB/LSA controller, the request message comprising at least device identification (ID), requested target certification validity and requested target certification region.

4. The device of claim 1, wherein the dynamic certification module is to claim at least one of the available certifications, and is further to control operation of the communication module in the shared wireless spectrum based on the at least one available certification.

5. The device of claim 4, wherein the dynamic certification module is to claim a first available certification having a first expiration based on at least one of time or region, and is to claim a second available certification having a second expiration based on at least one of a later time or different region prior to the expiration of the first available certification.

6. The device of claim 4, wherein the dynamic certification module is to receive an available certification confirmation message from the CSB/LSA controller prior to claiming at least one of the available certifications, the available certification confirmation message including at least one certification ID identifying the at least one available certificate to be claimed.

7. The device of claim 1, further comprising at least a processing module and memory module, the processing module causing the communication module to download a radio-enhanced application to the memory module, the radio-enhanced application causing the dynamic certification module to transmit the request message via the communication module.

8. A method, comprising:
    transmitting a request message requesting a certification allowing for operation in shared wireless spectrum based on at least one of time, device location or frequency bands;
    receiving a response message including available certification information; and
    determining if operation in the shared wireless spectrum is permitted based on the response message
    wherein:
    the certification comprises at least one of an electronic certification document or electronic token received in the device from a cloud spectrum broker/licensed shared access (CSB/LSA) controller; and
    the response message comprises available certification information including for each available certification at least certification ID, certification validity information and certification region information; and
    the method further comprises:
    determining if any of the available certifications are usable by the device for operating in the shared wireless spectrum; and
    if any of the available certifications are determined to be usable by the device, transmitting an available certification request message including at least one certification ID corresponding to an available certification.

9. The method of claim 8, further comprising causing transmission of the request message by downloading a radio-enhanced application including radio configuration information for operating in the shared wireless spectrum.

10. The method of claim 8, further comprising:
    claiming at least one of the available certifications; and
    controlling operation of the device in the shared wireless spectrum based on the at least one available certification.

11. The method of claim 10, further comprising:
    claiming a first available certification having a first expiration based on at least one of time or region; and
    claiming a second available certification having a second expiration based on at least one of a later time or different region prior to the expiration of the first available certification.

12. The method of claim 10, further comprising:
    receiving an available certification confirmation message via the communication module prior to claiming at least one of the available certifications, the available certification confirmation message including at least one certificate ID identifying the at least one available certification to be claimed.

13. At least one non-transitory machine-readable storage medium having stored thereon, individually or in combination, instructions that when executed by one or more processors result in the following operations comprising:

transmitting a request message requesting a certification allowing for operation in shared wireless spectrum based on at least one of time, device location or frequency bands;

receiving a response message including available certification information; and determining if operation in the shared wireless spectrum is permitted based on the response message;

wherein:
the certification comprises at least one of an electronic certification document or electronic token received in the device from a cloud spectrum broker/licensed shared access (CSB/LSA) controller;

the response message comprises available certification information including for each available certification at least certification ID, certification validity information and certification region information; and the instructions that when executed further result in the following operations comprising:
determining if any of the available certifications are usable by the device for operating in the shared wireless spectrum; and if any of the available certifications are determined to be usable by the device, transmitting an available certification request message including at least one certification ID corresponding to the available certification.

14. The non-transitory machine-readable medium of claim 13, further comprising instructions that when executed by the one or more processors result in the following operations comprising:

causing transmission of the request message by downloading a radio-enhanced application including radio configuration information for operating in the shared wireless spectrum.

15. The non-transitory machine-readable medium of claim 14, further comprising instructions that when executed by the one or more processors result in the following operations comprising:

claiming at least one of the available certifications; and
controlling operation of the device in the shared wireless spectrum based on the at least one available certification.

16. The non-transitory machine-readable medium of claim 15, further comprising instructions that when executed by the one or more processors result in the following operations comprising:

claiming a first available certification having a first expiration based on at least one of time or region; and claiming a second available certification having a second expiration based on at least one of a later time or different region prior to the expiration of the first available certification.

17. The non-transitory machine-readable medium of claim 15, further comprising instructions that when executed by the one or more processors result in the following operations comprising:

receiving an available certification confirmation message via a communication module prior to claiming at least one of the available certifications, the available certification confirmation message including at least one certificate ID identifying the at least one available certification to be claimed.

* * * * *